DESIGN.
G. STROHHAKER.
SPOON, FORK, OR SIMILAR ARTICLE.
APPLICATION FILED NOV. 23, 1911.
Reissued Jan. 9, 1912.
13,360.
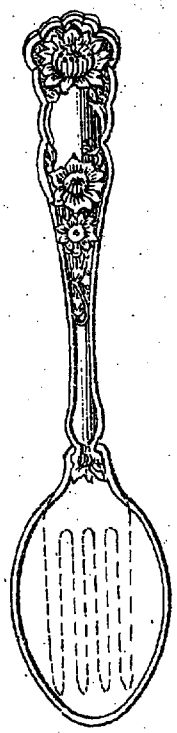
Witnesses.
M. P. Nichols
C. L. Weed
Inventor
Gustave Strohhaker
by Seymour Pearce
Attys

UNITED STATES PATENT OFFICE.

GUSTAVE STROHHAKER, OF WALLINGFORD, CONNECTICUT, ASSIGNOR TO INTERNATIONAL SILVER CO., OF MERIDEN, CONNECTICUT, A CORPORATION OF NEW JERSEY.

DESIGN FOR A SPOON, FORK, OR SIMILAR ARTICLE.

13,360. Specification of Reissued Letters Patent. Reissued Jan. 9, 1912.

Original No. 41,804, dated September 26, 1911, Serial No. 642,415. Application for reissue filed November 23, 1911. Serial No. 662,063. Term of patent 7 years.

*To all whom it may concern:*

Be it known that I, GUSTAVE STROHHAKER, a citizen of the United States, residing at Wallingford, in the county of New Haven and State of Connecticut, have invented a new, original, and ornamental Design for a Spoon, Fork, or Similar Article; and I do hereby declare the accompanying drawing to be a full, clear, and exact illustration of the same, and which said drawing constitutes part of this specification, and represents a face view of a spoon, fork, or similar article embodying my design.

I claim:

The ornamental design for a spoon, fork or similar article as shown.

GUSTAVE STROHHAKER.

Witnesses:

JOHN A. MARTIN,
CHARLES W. COOK.